United States Patent [19]
Fouche et al.

[11] Patent Number: 5,091,773
[45] Date of Patent: Feb. 25, 1992

[54] PROCESS AND DEVICE FOR IMAGE DISPLAY WITH AUTOMATIC DEFECT CORRECTION BY FEEDBACK

[75] Inventors: Yvon Fouche, Chatenay Malabry; Tristan D. Couasnon, Rennes; Jean-Yves Eouzan, Thorignf Fouillard/Cesson Sevicne, all of France

[73] Assignee: Thomson-CSF, Puteaux, France

[21] Appl. No.: 592,257

[22] Filed: Oct. 3, 1990

[30] Foreign Application Priority Data

Oct. 3, 1989 [FR] France .................. 89 12889

[51] Int. Cl.⁵ .......................................... H04N 17/02
[52] U.S. Cl. ..................................... 358/10; 358/139
[58] Field of Search .............................. 358/139, 10

[56] References Cited

U.S. PATENT DOCUMENTS

| | | | |
|---|---|---|---|
| 4,354,243 | 10/1982 | Ryan et al. | 358/10 X |
| 4,439,735 | 3/1984 | Alvite et al. | 358/10 X |
| 4,533,950 | 8/1985 | Harshbarger | 358/139 |
| 4,687,973 | 8/1987 | Holmes et al. | |
| 4,730,213 | 3/1988 | Kelly, III et al. | 358/10 X |
| 4,760,447 | 7/1988 | Koka et al. | 358/10 X |

FOREIGN PATENT DOCUMENTS

| | | |
|---|---|---|
| 0324991 | 7/1989 | European Pat. Off. . |
| 3732002 | 4/1989 | Fed. Rep. of Germany . |
| 1588652 | 4/1981 | United Kingdom . |

Primary Examiner—Victor R. Kostak
Attorney, Agent, or Firm—Oblon, Spivak, McClelland, Maier & Neustadt

[57] ABSTRACT

An automatic defect correction drive utilizing feedback in an image display device. According to the present invention, during an acquisition phase, a test image constituted of bright points of known positions distributed on a screen is displayed. This displayed image is then analyzed via an image acquisition device, to deduce from it the scanning, focusing and amplitude corrections to be applied to the display, so that the test pixels displayed on the screen have their expected positions and characteristics. These corrections are then interpolated for the intermediate pixels between test points, and then, during a continuation phase, these corrections are updated.

14 Claims, 5 Drawing Sheets

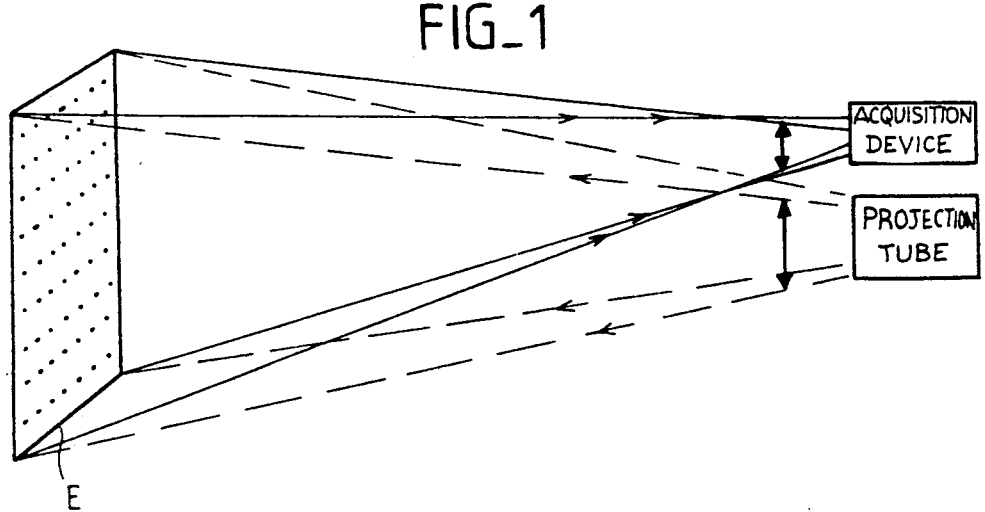
FIG_1
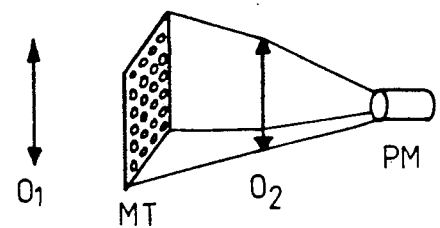
FIG_2
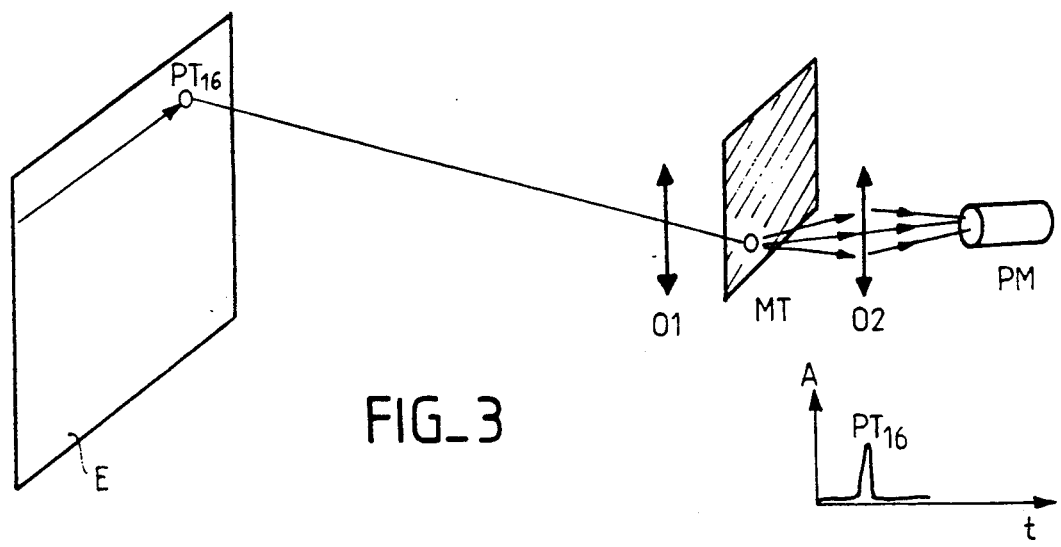
FIG_3

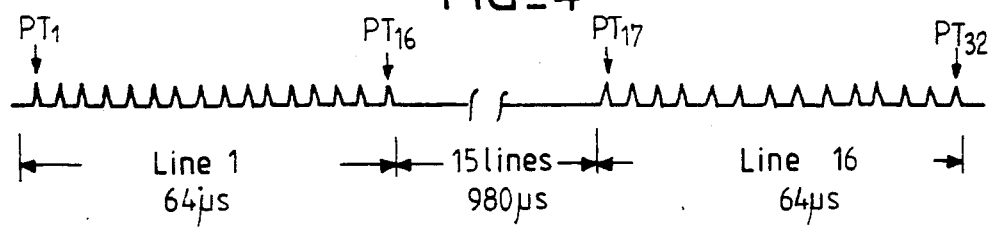
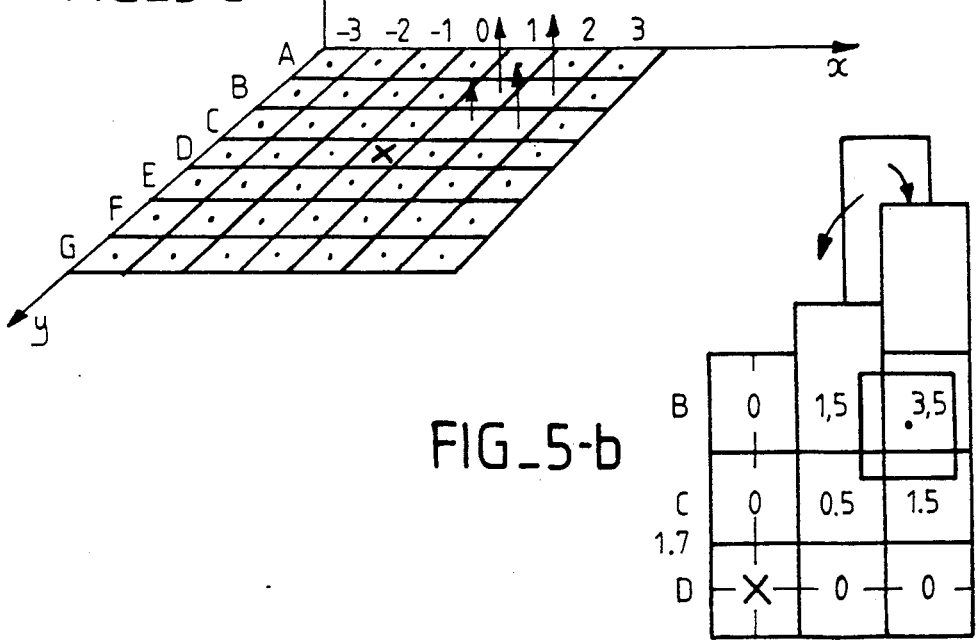
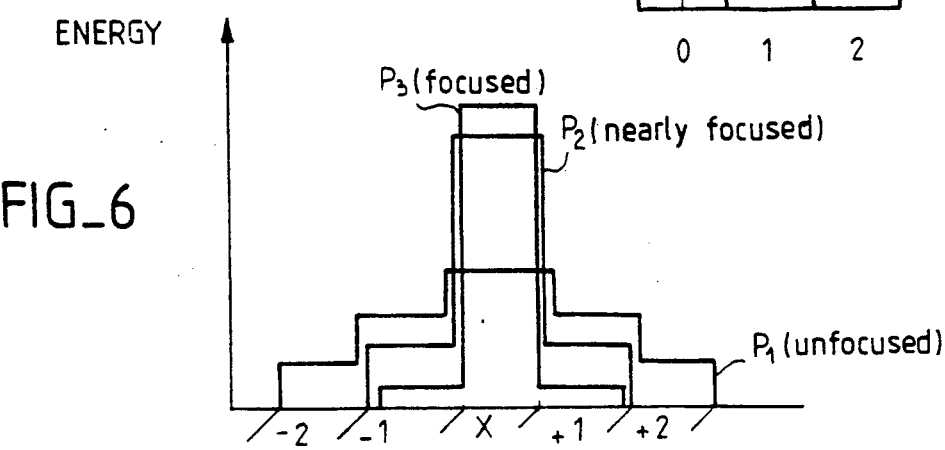

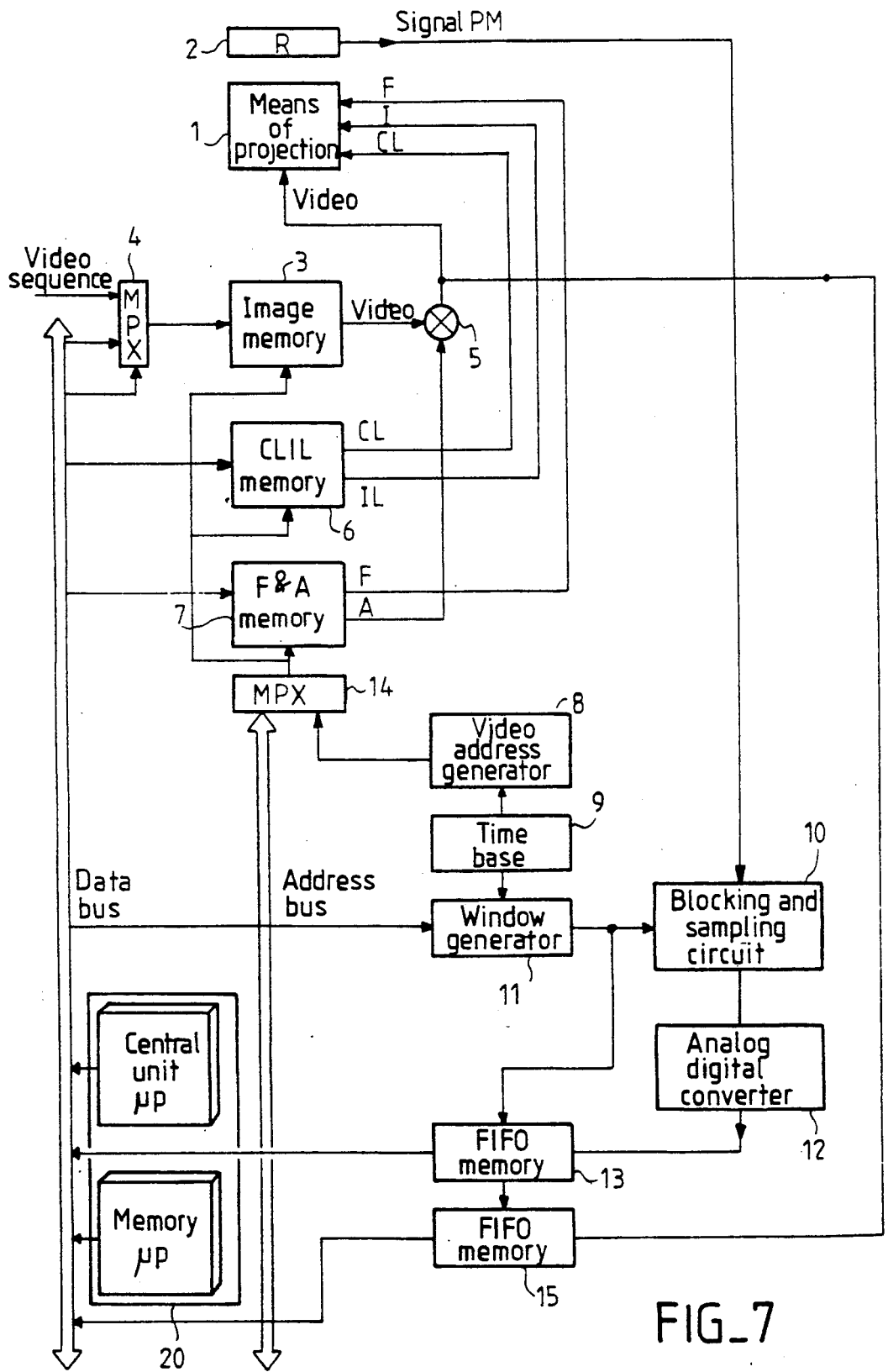
FIG_7

FIG_8
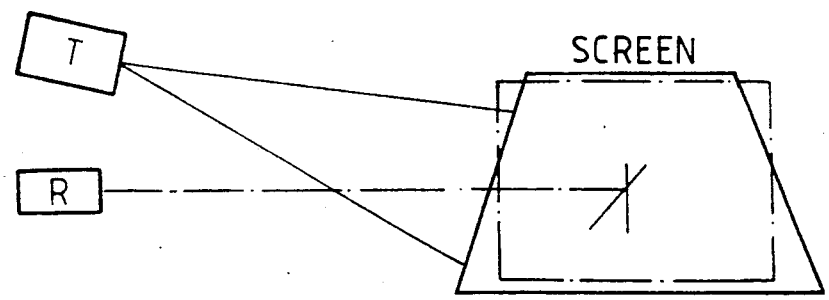
FIG_9
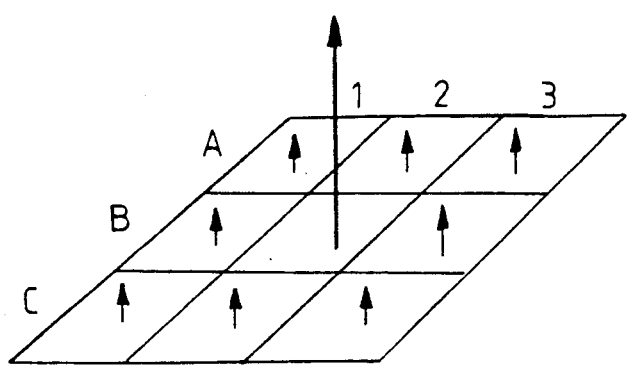
FIG_10
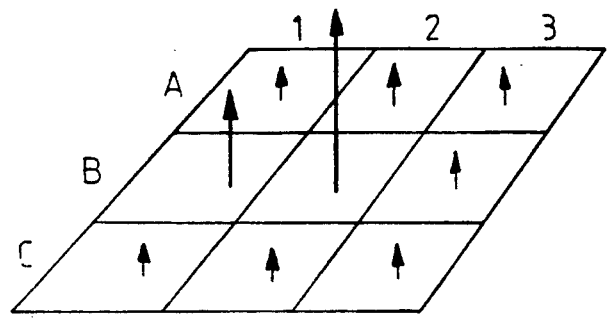

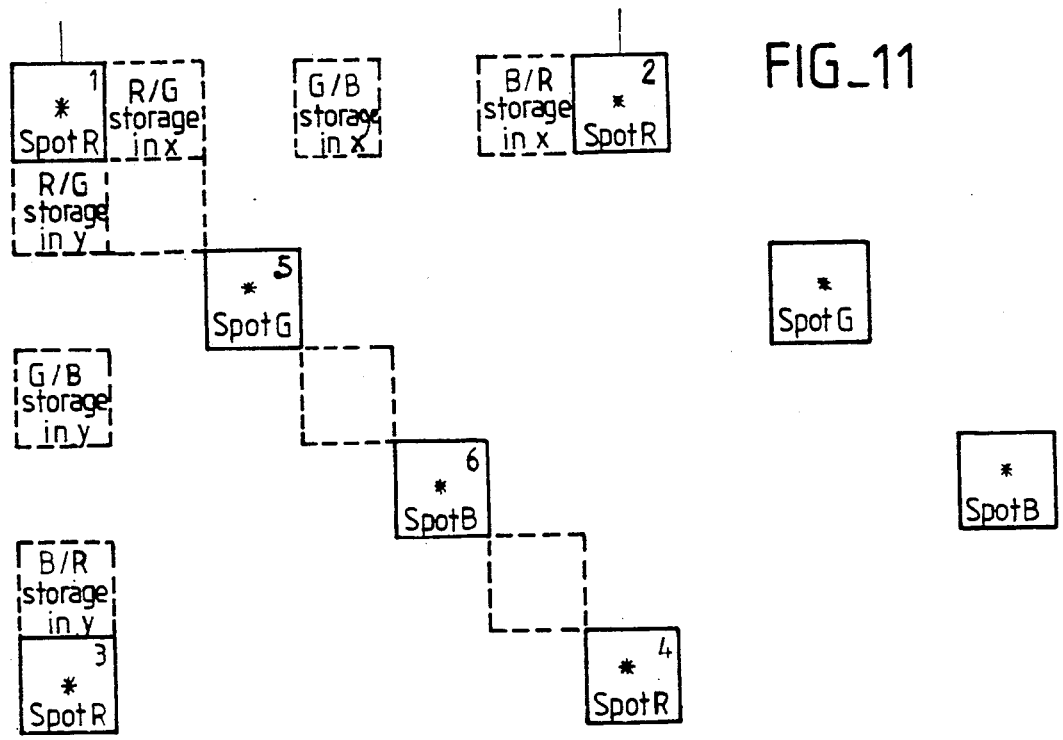
FIG_11
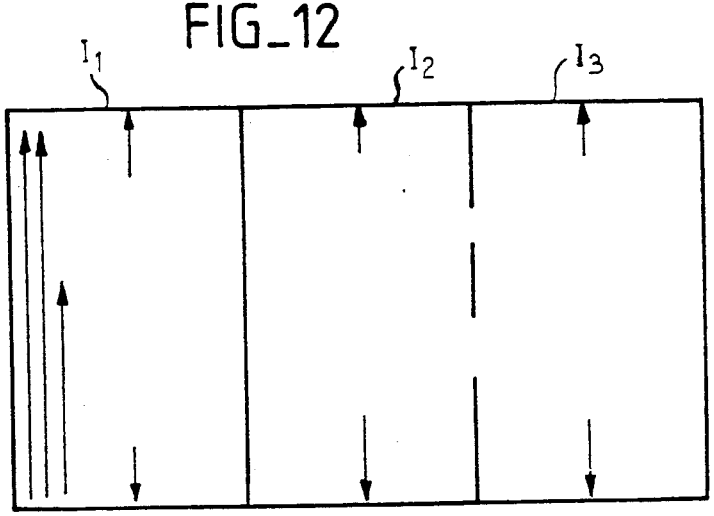
FIG_12

PROCESS AND DEVICE FOR IMAGE DISPLAY WITH AUTOMATIC DEFECT CORRECTION BY FEEDBACK

BACKGROUND OF THE INVENTION

1. Field of the Invention

The invention concerns the field of image display, notably for high-resolution display devices using projectors or back projectors forming the images on a screen or display tubes, and the object of this invention is more particularly a process, and the corresponding device, for image display with automatic defect correction by feedback.

2. Description of the Prior Art

In high-resolution display devices, numerous defects can affect an image, whether it is obtained by projection or back projection on a screen from a monochrome or trichrome tube, or from a set of display tubes.

These defects have many causes (tubes, optical system, electronic parts, movements) and their effects vary with time.

We can list in particular:
geometric defects: the image can be deformed into a barrel-shape around its periphery, for example;
lighting focus defects;
defects of alignment of the three tubes for a trichrome image;
variations with time of these defects.

Until now these defects have made it impossible to design an association of several projectors to create a very high-quality image over its whole area, or a very large image of "wall" type by composition of images from different projectors or groups of projectors.

SUMMARY OF THE INVENTION

The object of the invention is to solve this problem by equipping the projection chain with a feedback device, operating from the image projected onto a large screen or shown on the display tube, to perform continuous defect analysis and make the necessary corrections, by calculation, to each elementary device involved in the formation of the image.

According to the invention, a process of image correction by means of display on a screen is characterized by the facts:

that it uses for automatic defect correction an image acquisition device which analyses the screen through a spatial filter; the correction involves two successive phases, an acquisition or analysis phase and a correction phase, that during the acquisition phase, a test image with bright isolated pixels, distributed in the image and with spatially fixed positions, is displayed, the acquisition device being such that as the spatial filter is exactly adapted to the test image, a maximum output signal is detected when a pixel of the test image displayed coincides with its exact position, this acquisition phase including a stage of spatial calibration where the bright pixels of the test image displayed are brought back to their expected positions on the screen, by correction of the horizontal and vertical scanning of the means of display based on the results of image analysis by the acquisition device, the corresponding corrections for the different pixels of the test image being memorized and the corrections for the intermediate pixels being calculated by interpolation from the nearby measured values, and that during the continuation phase during which the sequence of video images is displayed, the image displayed is analyzed through the spatial filter to update the scanning, focusing and amplitude corrections if necessary and to change their memorized values according to the results of the analysis.

Another object of the invention is the display device with automatic correction by feedback intended to make use of this process.

BRIEF DESCRIPTION OF THE DRAWINGS

The invention will be better understood and other characteristics will appear on reading the description below with reference to the appended drawings.

FIG. 1 shows a test image projected during a phase of correction acquisition;

FIG. 2 shows a mode of embodiment of the image acquisition device;

FIG. 3 illustrates the functioning of the image acquisition device;

FIG. 4 is the chronogram of the output signal of the photodetector;

FIGS. 5a and 5b are two explanatory diagrams;

FIG. 6 shows the energy distribution, around a centered pixel, during focus correction;

FIG. 7 is an overall diagram of the automatic correction device according to the invention;

FIG. 8 outlines a trapezoidal image deformation;

FIG. 9 shows the lighting received by the photodetector, through the mask, in the neighborhood of a centered test point;

FIG. 10 shows the lighting received by the photodetector, through the mask, in the neighborhood of a noncentered test point;

FIG. 11 shows the windows used in the continuation mode for the three channels of a trichrome projector;

FIG. 12 shows an image formed in 3 parts by 9 projectors associated in 3 groups.

The description below is made with respect to image display by projection, but the invention also applies to display on a display tube, the image being recovered on the screen of the display tube itself instead of on the projection screen.

DESCRIPTION OF THE PREFERRED EMBODIMENT

The process and corresponding device are described below in accordance with several modes of embodiment applied successively
to a monochrome projector
to a trichrome projector
to a projector made up of a set of N groups of trichrome projectors (N=3 for example).

In each case, the correction process is in several phases according to one and then the other of two modes of operation:

the first mode is known as the acquisition mode, and is used when the equipment is switched on. When the machine is switched on, the deviations risk being great while it warms up, and it is acceptable for the machine not to function immediately; this starting up phase is therefore used to project one or more test images;

the second mode is known as the continuation mode, i.e. the projector works from an external source of video images without introducing a particular test point into the video sequence; the system then continues to eliminate the slight drifts immediately.

For a monochrome projector in the acquisition mode, to compensate for geometric defects, the process consists in measuring, for a number of pixels distributed evenly over the whole surface of the screen, the real position of the pixels with respect to their ideal position in order to deduce the correction from this. For this purpose a test image defining the marker points is constituted and projected.

To fix an order of magnitude a test image can be made completely black with just 16 evenly-spaced points per line on 16 evenly-spaced lines, i.e. 256 bright spots at the corners of aligned rectangles. This test image, created completely electronically, is accurate to the nearest pixel in line and frame (or image). FIG. 1 shows such a test image (reversed: black dots on the figure corresponding to bright spots) projected on the screen E by means of projection such as a tube.

The acquisition device 2 can be constituted of a CCD imager for example: by analysis of the image received, the bright spots are detected and their positions on the screen measured; the corrections to be applied to the projector scanning control signals to bring the 256 test points to their ideal marker positions are then calculated.

Thus briefly described, this process does not take into account the distortions of the optical system of the acquisition device: the true geometry is in fact on the screen (for the observer). To solve this problem we can consider that a photograph is taken of an ideal black screen on which have been placed the bright marker points of pixel size. The positive development of the film then constitutes an ideal spatial filter corresponding to a test image projected onto the acquisition device.

A preferred mode of embodiment of the acquisition device is represented in FIG. 2 and is therefore constituted of a lens $O_1$, a holed mask (test image indicated above) MT placed at a distance identical to that of a second lens $O_2$ which brings the image of the holed mask on to the whole of the input area of a photodetector PM. The image persistence is to a certain degree eliminated by filtering, and in particular by digitizing the signal $s(t) - s(t - \tau)$, $\tau$ being the time the image of the spot takes to pass in front of the hole.

When the projector is completely adjusted to the test image formed of 256 bright spots on a black background projected continuously onto the large screen, the images of the bright spots on the large screen acquired by $O_1$ are located in the transparent zones of the mask MT. Each of these zones then behaves as a light source in turn.

FIG. 3 illustrates the functioning of the device in the acquisition phase. When the screen is scanned by the video projector spot, as shown in FIG. 3, the different test points will light up one after the other and pass through the holes in the mask, to create an electrical signal at the output of the photodetector PM. The temporal position of the signals is unequivocally linked to each test point $PT_n$, for $n=1$ to 256, for example.

FIG. 4 represents the chronogram of the output signal from the photodetector for a conventional TV signal, for example when the adjustment has been acquired.

In practice, when it is switched on in this configuration, the adjustment is not acquired. To acquire it, it is possible to work in stages, seeking first to obtain the four corners of the image in exact positions, for example.

To do so, the holed mask MT being fixed, a means of obtaining a useful signal on the photodetector PM is to move the test point on the line and over several lines around its presumed position, until the impulse responses at an output from the photodetector PM around a test point X are obtained for these various adjacent positions. FIG. 5a illustrates the amplitude (z) responses obtained at an output from the photodetector for the 49 (7×7) positions surrounding the first test point x, x varying between −3 and +3 and y between A and G, the test point having the coordinates (D, 0). It can be seen in the example shown that points (B, 1), (B, 2), (C, 1) and (C, 2) contribute to excitation of the photodetector PM.

FIG. 5b specifies in a matrix the points for which a signal has been detected with the corresponding amplitudes. These amplitudes enable very precise calculation of the vertical and horizontal offsets to be applied to the test point to make its position exact. As an example, using the values shown in FIG. 5b:

along the X-axis, there is a partial offset of $(1.5)/(1.5+3.5)$ between columns 1 and 2, corresponding to a delay since the pixels lit up are after the test point horizontally (columns 1 and 2), along the Y-axis there is a partial offset of $(1.5)/(3.5+1.5)$ between lines B and C corresponding to an advance, since the pixels lit up are before the test point vertically (lines B and C).

So there is an offset of X corresponding to a delay of 1.7 pixel and of Y corresponding to an advance of 1.7 pixel.

Corrections must therefore be applied to the scanning aiming to brake the vertical scanning and accelerate the horizontal scanning (by X and Y) so that the test point is in its correct position.

Thus by lighting up at each image (or frame) the corresponding points around the ideal positions of the test points, it is possible to correct the scanning over the whole of the projected image repeatedly around each test position, which is the end of a first stage, known as spatial calibration, of the acquisition phase.

The focusing and amplitudes are then calibrated. If the projector allows dynamic adjustment of the focusing, analysis of responses using a grid identical to that in FIG. 5a, in the centered box and in adjacent boxes, enables the focusing to be best adjusted at each point by diminishing the responses in the neighboring boxes as far as possible (without eliminating them totally), while increasing the central response. FIG. 6 represents the profiles of the energies received in one scanning direction around a centered pixel X, during the focus correction, for three distinct adjustments of the focusing: $P_1$ out-of-focus, $P_2$ nearly focused and $P_3$ focused.

Finally, once the focusing has been optimized over the whole area of the screen, the energy received in each test point is analyzed to perform pre-compensation by multiplying the video signal by a pre-compensation factor from a tabular memory.

This phase of correction acquisition is then at an end, and the sequence of video images to be used is then projected. A second phase, known as the continuation phase, enables the adjustments to be updated directly from the current signal, as will be described in more detail after a description of the device used for this purpose.

The diagram of this device is shown in FIG. 7.

The means of projection 1 and the acquisition device 2 described above are associated with the circuits described below.

An image memory 3 contains either the digital values of an incident video signal or those of a synthetic video signal written by the microprocessor 20 by execution of the instructions contained in its program memory, depending on the status of an input multiplexer 4 controlled by the microprocessor 20, whose memory and central unit have been shown. The output signal from the image memory is the "video" signal to be applied to the means of projection.

Two other memories, double ones, are used:
a line and interline correction memory CLIL, 6, written to by the microprocessor and containing for each position of the image the digital corrections to be applied to the horizontal scanning, line correction CL, and to the vertical scanning, interline correction IL, of the means of projection 1.
a focusing and amplitude correction memory F&A, 7, also written to by the microprocessor and containing for each position of the image a focus correction F to be applied to the means of projection and an amplitude correction, A, to be applied to a multiplier 5 also connected to the "video" output of the image memory 3.

All the memories, the image memory 3 and the correction memories 6 and 7 are either written to or read from in random access by the microprocessor 20, or read from at video speed thanks to a video address generator 8, controlled by a time base circuit 9. For this purpose a multiplexer 14 has its inputs connected respectively to an address bus at output from the microprocessor 20 and at the output from the address generator 8. Its output position is controlled by the microprocessor and its output is connected to the memories 3, 6 and 7.

To simplify understanding it can be supposed that the microprocessor writes/reads in the memories 3, 6 and 7 during the frame suppressions.

To close the looped device for automatic correction by feedback, the output signal PM of the photodetector from the acquisition device 2 is sampled by a blocking sampling circuit 10, controlled by a signal from a window generator, 11.

The window generator is a circuit which opens a measurement window in the signal from the photodetector from a point line position ×given by the microprocessor 20, signals from the time base circuit 9, and a delay programmed by the microprocessor 20; for this purpose the window generator is connected to the data bus of the microprocessor and to the output from the time base. This window corresponds to the instant the test point x considered at a given instant is lighted up (or the N test points of the image). The output signal from the circuit 10 is digitized by an analog/digital converter 12 connected to the entry of a FIFO memory stack 13 read by the microprocessor 20.

Thus, the microprocessor can control the lighting up of a test point by writing at its address the corresponding value at the maximum luminance level in the image memory 3 (the rest of which it has previously set to 0), program the window generator to obtain an output signal from the photodetector of the acquisition device 2, bring the first point back to its place on the screen thanks to the line and interline correction memories, 6, and then do the same with the other 3 corners of the image, and finally with the 256 test points making up the test image.

The device can in the same way execute the focusing and amplitude corrections for the 256 test points, and also interpolate continuously for all the other points in the image so as to fill the correction memories with the corresponding values CL, IL, F and A for all the address values corresponding to all the points in the image.

As long as the acquisition device is kept separate from the means of projection, it is also possible to correct trapezoidal deformations such as those represented in FIG. 8, due to non-axial positioning of the projection tube 1, on the single condition that the acquisition device 2 is well centered with respect to the screen.

When this preliminary phase of acquisition of the correction values is finished, as indicated above, the device passes into a continuation mode to adjust the corrections as the video signal changes.

After the time required to set the device in operation, it can be supposed that the larger drifts of the scanning characteristics have already occurred and been compensated for in acquisition mode thanks to the test points projected in the place of the incident video signal.

The incident video signal sequence can then be projected, but it is no longer possible to include test points in the video from time to time, as an observant spectator could detect these points as defects.

The principle of the continuation mode therefore consists in measuring errors, of position for example, this time using the current video.

At the end of the acquisition mode, the delay between the output of a pixel from the image memory, read by the time base, and the arrival of the signal corresponding to this pixel at the output of the photodetector has been precisely calibrated.

In the continuation mode, if we suppose at first that the content of the image is locally uniform around a test position (which is statistically very probable), if the system is well-calibrated, the act of setting of the photodetector several times, e.g. nine consecutive times (corresponding to instants of lighting related to the spatial positions near the test point) in principle gives a set of responses centered as represented in FIG. 9, the responses in neighboring boxes being due mainly to the backscattering background noise and to the diffraction caused by the holes in the mask. These phenomena can be assumed to be isodirective and of first order.

If the system now has a tendency to drift towards a horizontal direction, for example, the response will no longer be centered but will look like that shown in FIG. 10. By interpolation, it is then possible to estimate and correct the displacement.

The simplifying assumption of local uniformity of the video around a test position can then be eliminated. The nine measurements can be made in nine windows temporally opened in nine consecutive frames (or images). The amplitude of the video signal of the current test point considered is taken into account thanks to a correction applied to the signal received at an output from the photodetector of the acquisition device and aiming to work with a maximum nominal amplitude (white spot).

The ideal case is therefore that where the calibration point corresponds to a locally constant video signal (homogeneous zone in the image) with a fairly bright signal (to have a significant useful signal) and temporally stable over 9 frames (or images).

If this is not the case it is possible to introduce, in the interpolation calculations to obtain the displacement, corrections calculated on the basis of the 9 local values in 9 successive frames (or images), these values having been memorized at an output from the image memory. If absolutely necessary, if the video signal does not possess the required conditions, for example for strong contours which disturb the measurements, the calibration at this point can be eliminated and re-done later, the correction values keeping their previously-validated values.

Finally it should be noted that other modes of operation are possible: in particular with a blocker-sampler and analog-digital converter which are fast enough, the nine measurements/acquisitions can be made rapidly on the same frame.

As operational drifting is fairly slow, the continuation system can simply measure at a single reference position per frame (or image).

The residual low-frequency vibrations of the unit can also be eliminated: for this purpose the movement correlations of the 4 corners of the image are analyzed continuously. If these 4 points undergo identical displacement, the conclusion is that the whole image is moving and a corresponding displacement correction is performed by analysis of the vibration and anticipation of the correction.

Consequently, in the continuation mode, the position of the test points is controlled using the incident video and the measurement of spatial deformations is replaced by temporal response measurements.

This of course implies that the memory reading clock (not shown) is perfectly stable with respect to the measurement periods (quartz clock).

To operate in the continuation mode for a monochrome projector, i.e. to carry out these calibration functions during projection, the device shown in FIG. 7 possesses the following additional means:

the window generator (11) is capable of generating, around a point designated by the microprocessor, 9 sampling instants corresponding to the neighborhood of this point in one frame or in 9 consecutive frames; a FIFO memory stack 15 is also available to memorize the amplitudes of the points corresponding to the window, as they appear after correction at an output from the multiplier 5.

Thus, after acquisition of the output signal from the photodetector of the acquisition device 2, which is digitized, the microprocessor 20 analyzes the corresponding values of the video amplitudes of the points:

if these correspond to a relatively homogeneous zone of the image (no contours), the microprocessor evaluates the geometric deformations, and the amplitude response if the geometric deformation is zero;

if, on the other hand, the zone includes an important transition on the test point, the microprocessor estimates only the focusing, if during the previous passage the geometric correction was zero (point assumed to be correctly positioned). During the acquisition phase, it is possible to generate patterns corresponding to various horizontal and vertical contours at each test point and to model the corresponding responses. Then, if in continuation phase the observed response is different from the model acquired, a focus correction (low amplitude) can be performed.

For a trichrome projector, the acquisition mode in its calibration phase poses no specific problems to the extent that the microprocessor can generate a test pattern for one primary color at a time (for example R active, G and B inactive, then G active, R and B inactive, etc.), and perform all its position correction, focusing and gain measurements in this way.

In order to ensure separate testing and correction on each channel, the structure represented in FIG. 7 is partially tripled for trichrome projection methods, notably for the memories, and therefore comprises:

3 image memories for the R, G, B components, such as the memory 3 represented;

3 double memories for the line and inter-line corrections such as 6;

3 double memories for the focusing and amplitude corrections such as 7;

3 amplitude correction multipliers such as 5;

3 address generation devices such as 8 and three multiplexers such as 14.

All these are connected to the microprocessor as before and the microprocessor can write and read in all the memories.

For a trichrome projector in the continuation mode, when the current video signal is projected, the problem is to measure the development of defects continuously for each channel. One difficulty stems from the separation of the corrections for each channel: how can the performance of one channel be measured without taking into account the contribution of the other channels which must operate in parallel?

A laborious solution would be to use 3 analysis systems with filters, but such non-united analysis could create disadvantages.

As a result, the solution used in the invention consists in using the 3 image memories to "desynchronize" the scanning of the three components: the spots associated respectively with the three channels will thus be offset as shown in FIG. 11 in such a way that only one spot can pass at any moment in front of a single window (separation of the contributions from the R, G and B channels).

If a is the window side length, in the example $a=3$ for a $3 \times 3$ window, there must be a minimum step of $6a$ between test points of the same color to "desynchronize" the 3 channels of the trichrome projector.

For a trichrome projector and images of definition $512^2$ or $1024^2$, with a grid of $16 \times 16$ test points distributed evenly over the whole of the image, the potential exploratory spaces or windows of maximum dimension a around a test point are such that: for a $512^2$ image (or $1024^2$), the spacing between consecutive test points is $512/16 = 32$ (or $1024/16 = 64$), and the maximum dimension of the window deduced from the minimum spacing, $32/6 = 5$ (or $64/6 = 10$) The maximum window dimensions for these two cases are therefore $a=5$ and $a=9$ respectively.

These windows are sufficient for correction value acquisition.

A trichrome projector in the continuation mode does not, therefore, require any device in addition to those described above. The independence of the measurements on each channel is guaranteed by the offset scanning described above and on each channel, the measurements and corrections described are used as for a monochrome projector, i.e. the line and interline scanning corrections and the amplitude and focusing corrections, but the number of elementary operations to be performed by the microprocessor is multiplied by 3.

In the acquisition mode, it was indicated above that three tubes with a precision of better than one pixel can be superimposed over the whole area of the image, and that this can be done in operation on the current video signal.

The application to a 3-tube trichrome projector can be transposed to a system with a greater number of elementary projectors, for example with the aim of forming a wall of images from N groups of projectors.

In particular if the efficiency in blue is poor, 2 blue tubes can be associated on condition that:
the test points of these two blue channels are offset,
a complementary channel is inserted, with image memories and line, interline, amplitude and focusing correction memories, amplitude correction multiplier, address generator, and the software required for processing this fourth channel.

Further on we shall deal with systems using one or more elementary groups of 3 tubes for displaying trichrome images, but an elementary group can possess four tubes as long as the conditions mentioned above are fulfilled.

As long as the projectors within a group can be perfectly aligned, it is possible in the same way to align the projectors of several groups with the same precision.

The only precaution to be taken is to observe the offsets like those in FIG. 11 between the different beams.

For M elementary projectors the step between test points must be equal to 2.M.a, a being the dimension of the test window around a point.

For M=9, corresponding to a wall of 9 projectors associated in 3 elementary groups of 3 projection tubes, each group forming a trichrome image zone, $I_1$, $I_2$ and $I_3$ respectively, and arranged so that each operates in continuous scanning as shown in FIG. 12, the step necessary between test points is 18a.

If $a=3$, $18a=54$, and $16\times 18a=869$ test points

If $a=5$, $18a=90$, and $16\times 18a=1440$ test points

If $a=7$, $18a=126$, and $16\times 18a=2016$ test points

It is clear then that for an association of 3 three-tube projectors, it is possible to work with a window of width 7, but on the other hand the height of the image (1250 lines) makes it necessary to work with a search window of height 3 (the window does not have to be square).

In the same way the system adapted to N groups of projectors in the continuation mode can be deduced from the architecture of a trichrome system: as many units constituted of an image memory 3, correction memories 6 and 7, a video address generator 8 and a multiplier 5 are necessary as there are elementary tubes. As the load on the microprocessor increases, it is advisable, in the continuation mode, to have greater calculation power available. A conventional multi-microprocessor architecture can be envisaged.

The invention is not restricted to the modes of embodiment precisely described. In particular, the test image has been described as being formed of evenly-spaced points on evenly-spaced lines. This distribution can be modified if necessary to be better suited to the defects to be corrected: a holed mask with a greater density of points in the zones of images where defects are more sensitive could be envisaged.

In addition, it was also indicated above that automatic defect correction by feedback is also applicable to display tubes. In this case the image acquisition device can simply be constituted of reflecting pellets placed on the test pixels distributed on the tube screen; the photodetector can then be integrated into the tube.

The invention applies both to video projectors or back projectors and to image "walls" or even index tubes.

What is claimed is:

1. A process for image display, by means of a display on a screen, for providing automatic defect correction by an image acquisition device analyzing the screen through a spatial filter, comprising the steps of:
performing an acquisition phase, comprising the steps of:
displaying a test image including bright isolated pixels distributed in the test image and with spatially fixed positions on the screen, wherein the spatial filter is adapted to be in alignment with the test image,
detecting a maximum output signal when a pixel of the test image coincides with its expected position;
performing a spatial calibration stage where the bright isolated pixels of the test image display are brought into coincide with their expected positions on the screen, by correction values of horizontal and vertical scannings of the display on the basis of results of image analysis by the acquisition device;
storing the correction values for the pixels of the test image in a memory;
interpolating correction values for intermediate pixels by interpolation from correction values from nearby detected pixels; and
performing a continuation phase comprising the steps of:
displaying a sequence of video images wherein the sequence of video images displayed is acquired and analyzed through the spatial filter to update the scanning;
focusing and amplitude correcting where necessary and modifying the stored correction values in consequence based on results of the analysis.

2. The process according to claim 1, wherein the acquisition phase further comprises the step of calibrating focuses and amplitudes of the display using the same grid of test points as the spatial calibration stage, where an output signal of the acquisition device is maximized for the bright isolated pixels by acting on a focusing system of the display and on a video signal multiplier.

3. The process according to claim 1, wherein the test image comprises n evenly-distributed bright isolated pixels, the spatial filter being a mask with holes distributed in alignment with the n evenly-distributed bright pixels, where n is an integer.

4. The process according to any one of claims 1 or 2, wherein the acquisition phase begins with the analysis and exact positioning of the test pixels situated in the corners of the image, and then of the other test pixels in the test image.

5. The process according to claim 2, wherein the focusing and amplitude calibration step comprising the further steps of:

for focusing calibration, analyzing the output signals from the acquisition device associated with pixels near a pixel positioned during the previous stage and minimizing these signals associated with the neighboring pixels by increasing the signal associated with the central pixel; and for amplitude adjustment, bringing the signal to its nominal value by multiplication of the video signal by a precomposition factor which is a function of the amplitude of the signal detected.

6. The process according to claim 1, wherein the continuation phase is performed by comparative analysis of the output signals from the acquisition device for the pixels of a window centered on a test pixel in a sequence of consecutive images, results of this analysis being used to calculate the correction values when the window is in a homogeneous and stable zone of the current image in the image sequence.

7. The process according to claim 6, wherein the correction values for the test pixels which have not been used, because they are not situated in the homogeneous and stable zone, are calculated by interpolation based on the correction values memorized for neighboring test pixels, like the correction values for the pixels intermediate between consecutive test pixels.

8. An image display device with automatic defect correction for displaying an image on a screen, comprising:

a source of a test image and a source of a sequence of images alternately connected to an input of an image memory during phases of acquisition and continuation;

an image acquisition device comprising a spatial filter of a holed mask;

means for analyzing the radiation received through the mask;

a time base circuit;

a window generator controlled by a processor and by the time base circuit and connected to a control input of a sampling circuit of a signal output from the acquisition device, in series with an analog converter and with a buffer memory system, wherein the window generator transfers the values of the output signal of the image analysis system, for the pixels selected, to a correction calculation processor;

the correction calculation processor operating from signals read from the image memory and the buffer memory system; and a correction memory system with as many zones as possible types of corrections and as many addresses in each zone as image pixels on the screen, this correction memory system being accessible in read and write modes by the calculation processor, and its outputs being connected to corresponding correction inputs on the display, wherein stored correction values may be modified base on results of analysis performed by said means for analyzing.

9. The device according to claim 8, wherein, for a monochrome display, the correction memory system comprises a horizontal scanning correction memory zone, a vertical scanning correction memory zone, a focus correction memory zone, and an amplitude and associated values correction memory zone.

10. The device according to claim 8, wherein, for a trichrome display of three colors, the image memory includes a memory zone allocated to each of the three colors, and the correction memory system comprises a correction memory zone associated with each of these three colors for each type of correction of horizontal scanning, vertical scanning, focusing and amplitude.

11. The device according to claim 10, wherein the image acquisition device is used to analyze radiation for the three colors, the window generator selecting test pixels, the neighboring pixels in corresponding windows, intercalated for these three colors and with sufficient spacing for independent acquisition of correction values in the three colors.

12. The device according to claim 8, wherein, for a display in which an image is formed on a screen with juxtaposed image parts, emanating from separate display units, the image acquisition device is used to analyze radiation from the whole of the image, the window generator selecting test pixels, and neighboring pixels in corresponding windows of the image, if necessary intercalated in each of these parts for trichrome images.

13. The device according to any one of claims 8 to 12, wherein, for a display in which images are projected or back projected on a screen, the image acquisition device with its axis aligned with the projection axis comprises a holed mask, an optical system by which the screen image and the holed mask are superimposed and which transmits the radiation filtered by the holed mask to a photodetector.

14. The device according to any one of claims 8 to 11, wherein, for a display by a display tube, the image acquisition device is constituted of reflecting pellets forming a spatial filter, placed on the test pixels of the tube screen, an optical analysis system and a photodetector associated therewith.

* * * * *

UNITED STATES PATENT AND TRADEMARK OFFICE
CERTIFICATE OF CORRECTION

PATENT NO.  : 5,091,773

DATED       : February 25, 1992

INVENTOR(S) : Yvon Fouche et al.

It is certified that error appears in the above-identified patent and that said Letters Patent is hereby corrected as shown below:

Title page, item [75], second inventor, should read,

--Tristan de Couasnon--, and the residence of the third inventor should be, --Thorigne Fouillard/Cesson Sevigne, France--.

Signed and Sealed this

First Day of June, 1993

Attest:

MICHAEL K. KIRK

Attesting Officer

Acting Commissioner of Patents and Trademarks